United States Patent
Nitano et al.

(10) Patent No.: US 9,744,988 B2
(45) Date of Patent: Aug. 29, 2017

(54) ELECTRIC POWER STEERING APPARATUS

(71) Applicants: TOYOTA JIDOSHA KABUSHIKI KAISHA, Toyota-shi, Aichi-ken (JP); JTEKT CORPORATION, Osaka-shi, Osaka (JP)

(72) Inventors: Masahide Nitano, Toyota (JP); Masafumi Takahashi, Toyota (JP); Kiyoshi Uchiyama, Nukata-gun (JP); Masashi Yamaguchi, Toyota (JP)

(73) Assignees: TOYOTA JIDOSHA KABUSHIKI KAISHA, Toyota (JP); JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/056,010

(22) Filed: Feb. 29, 2016

(65) Prior Publication Data

US 2016/0257337 A1    Sep. 8, 2016

(30) Foreign Application Priority Data

Mar. 6, 2015  (JP) .................. 2015-044511

(51) Int. Cl.
*B62D 5/04* (2006.01)
*B62D 3/08* (2006.01)

(52) U.S. Cl.
CPC .............. *B62D 5/0421* (2013.01); *B62D 3/08* (2013.01); *B62D 5/0424* (2013.01); *B62D 5/0448* (2013.01)

(58) Field of Classification Search
CPC ...... B62D 5/0421; B62D 3/08; B62D 5/0424; B62D 5/0448

USPC ......................................... 180/443, 444, 446
See application file for complete search history.

(56) References Cited

U.S. PATENT DOCUMENTS

| | | | |
|---|---|---|---|
| 9,168,948 B2 * | 10/2015 | Yamamoto ........... | B62D 5/0412 |
| 9,290,199 B2 * | 3/2016 | Bando .................. | B62D 5/0448 |
| 9,327,758 B2 * | 5/2016 | Watanabe ............ | B62D 5/0448 |
| 9,440,673 B2 * | 9/2016 | Nakamura ........... | B62D 5/0448 |
| 2007/0187169 A1 * | 8/2007 | Sasaki .................. | B62D 5/0424 |
| | | | 180/444 |

(Continued)

FOREIGN PATENT DOCUMENTS

| | | |
|---|---|---|
| DE | 10 2012 100 383 A1 | 6/2013 |
| JP | 2010-179836 A | 8/2010 |

(Continued)

*Primary Examiner* — Jacob Knutson
(74) *Attorney, Agent, or Firm* — Oliff PLC

(57) ABSTRACT

An electric power steering apparatus is configured to provide steering assistance as rotary torque of a driving toothed-pulley fixedly fitted to a rotary shaft of an electric motor is transmitted through a toothed belt to a driven toothed-pulley that rotates together with a ball screw nut in an integrated manner. The electric power steering apparatus is configured such that the amount of axial travel of a rack shaft is limited when a rack end and a housing come into contact with each other in the axial direction. The electric power steering apparatus includes a tilt allowing portion configured to cause the ball screw nut to tilt relative to a ball screw shaft such that the distance between the center of rotation of the driven toothed-pulley and that of the driving toothed-pulley increases when the rack end and the housing come into contact with each other in the axial direction.

3 Claims, 2 Drawing Sheets

(56) References Cited

U.S. PATENT DOCUMENTS

| | | | | |
|---|---|---|---|---|
| 2012/0181102 A1* | 7/2012 | Bando | B62D 5/0448 180/444 |
| 2014/0353070 A1* | 12/2014 | Tsukagoshi | B62D 5/0448 180/444 |
| 2015/0060187 A1* | 3/2015 | Yamaguchi | B62D 5/0448 180/444 |
| 2015/0274200 A1* | 10/2015 | Nakamura | B62D 5/0448 180/444 |
| 2015/0284020 A1* | 10/2015 | Asakura | F16H 25/2204 180/444 |
| 2015/0336605 A1* | 11/2015 | Vorwerck | B62D 5/0424 180/444 |
| 2016/0075368 A1* | 3/2016 | Watanabe | B62D 5/0448 180/444 |
| 2016/0207560 A1* | 7/2016 | Muto | B62D 5/0403 |

FOREIGN PATENT DOCUMENTS

| | | |
|---|---|---|
| JP | 2013-184682 A | 9/2013 |
| JP | 2013-194901 A | 9/2013 |
| JP | 2014-201196 A | 10/2014 |

* cited by examiner

ELECTRIC POWER STEERING APPARATUS

INCORPORATION BY REFERENCE

The disclosure of Japanese Patent Application No. 2015-044511 filed on Mar. 6, 2015 including the specification, drawings and abstract is incorporated herein by reference in its entirety.

BACKGROUND OF THE INVENTION

1. Field of the Invention

The invention relates generally to an electric power steering apparatus, and more specifically to an electric power steering apparatus configured to provide steering assistance by using an axial driving force that is applied to a rack shaft when the rotary torque generated by an electric motor is transmitted through a toothed belt to a ball screw nut.

2. Description of Related Art

This type of electric power steering apparatus is described in, for example, Japanese Patent Application Publication No. 2013-184682. In the electric power steering apparatus described in JP 2013-184682 A, in the case where the amount of axial travel (the stroke amount) of a rack shaft is limited when any one of rack ends provided at respective ends of the rack shaft and a housing come into contact with each other in the axial direction, while the rotation of a driven toothed-pulley is restricted at the stroke end, the tension of a part of a toothed belt is increased by the rotary inertia of a driving-side member, such as an electric motor, causing a possibility that the toothed belt will jump the teeth of the pulley (the toothed belt will fail to mesh properly with the teeth of the pulley). The phenomenon in which the toothed belt jumps the teeth of the pulley occurs, for example, because an increase in the tension of a part of the toothed belt causes a ball screw nut to tilt relative to a ball screw shaft such that the distance between the center of rotation of a driving toothed-pulley and the center of rotation of the driven toothed-pulley decreases. In this case, as the distance between the centers of rotation of these pulleys decreases, the support stiffness with which the driving toothed-pulley and the driven toothed-pulley support the toothed belt decreases, so that the toothed belt is more likely to jump the teeth of the pulley.

SUMMARY OF THE INVENTION

The invention provides an electric power steering apparatus configured such that a toothed belt is less likely to jump the teeth of a pulley.

An aspect of the invention relates to an electric power steering apparatus including: a ball screw shaft that is integral with a rack shaft provided so as to be movable relative to a housing in a vehicle-width direction; a ball screw nut rotatably mounted on the ball screw shaft, the ball screw nut being fitted at a portion of an outer periphery on one side in an axial direction, to the housing via a bearing such that the ball screw nut is rotatable relative to the housing and immovable in the axial direction relative to the housing; a driven toothed-pulley fixedly fitted onto a portion of the outer periphery of the ball screw nut on the other side in the axial direction, the driven toothed-pulley being configured to rotate together with the ball screw nut in an integrated manner; an electric motor mounted on the housing; a driving toothed-pulley to which rotary torque generated by the electric motor is transmitted, the driving toothed-pulley being located at the same position in the axial direction as the driven toothed-pulley; and a toothed belt looped over the driving toothed-pulley and the driven toothed-pulley to transmit the rotary torque generated by the electric motor to the ball screw nut. The electric power steering apparatus is configured to provide steering assistance by using an axial driving force that is applied to the rack shaft when the rotary torque generated by the electric motor is transmitted to the ball screw nut. The electric power steering apparatus is configured such that an amount of axial travel of the rack shaft is limited when a rack end provided at an end of the rack shaft and the housing come into contact with each other in the axial direction. The electric power steering apparatus includes a tilt allowing portion configured to cause the ball screw nut to tilt relative to the ball screw shaft such that a distance between a center of rotation of the driven toothed-pulley and a center of rotation of the driving toothed-pulley increases when the rack end and the housing come into contact with each other in the axial direction.

In the electric power steering apparatus according to the above aspect, in a case where the driven toothed-pulley, the driving toothed-pulley, and the toothed belt are disposed between the bearing and the rack end, the tilt allowing portion may be included in the housing, and, in the tilt allowing portion, axial stiffness of a housing first stopper portion that restricts an axial displacement of the bearing on the driving toothed-pulley side of the bearing may be set lower than axial stiffness of a housing second stopper portion that restricts the axial displacement of the bearing on the driven toothed-pulley side of the bearing. In the electric power steering apparatus according to the above aspect, in a case where the driven toothed-pulley, the driving toothed-pulley, and the toothed belt are disposed between the bearing and the rack end, the tilt allowing portion may be included in an outer race of the bearing, and, in the tilt allowing portion, axial stiffness of a first portion of the outer race, the first portion coming into contact with the housing first stopper portion that restricts an axial displacement of the bearing on the driving toothed-pulley side of the bearing, may be set lower than axial stiffness of a second portion of the outer race, the second portion coming into contact with the housing second stopper portion that restricts the axial displacement of the bearing on the driven toothed-pulley side of the bearing.

In the electric power steering apparatus according to the above aspect, in a case where the bearing is disposed between a position where the driving and driven toothed-pulleys and the toothed belt are provided and the rack end, the tilt allowing portion may be included in the housing, and, in the tilt allowing portion, axial stiffness of a housing first stopper portion that restricts an axial displacement of the bearing on the driving toothed-pulley side of the bearing may be set higher than axial stiffness of a housing second stopper portion that restricts the axial displacement of the bearing on the driven toothed-pulley side of the bearing. In the electric power steering apparatus according to the above aspect, in a case where the bearing is disposed between a position where the driving and driven toothed-pulleys and the toothed belt are provided and the rack end, the tilt allowing portion may be included in an outer race of the bearing, and, in the tilt allowing portion, axial stiffness of a first portion of the outer race, the first portion coming into contact with the housing first stopper portion that restricts an axial displacement of the bearing on the driving toothed-pulley side of the bearing, may be set higher than axial stiffness of a second portion of the outer race, the second portion coming into contact with the housing second stopper portion that restricts the axial displacement of the bearing on the driven toothed-pulley side of the bearing.

As described above, the electric power steering apparatus according to the aspect of the invention includes the tilt allowing portion that causes the ball screw nut to tilt relative to the ball screw shaft when the rack end and the housing come into contact with each other such that the distance between the center of rotation of the driving toothed-pulley and that of the driven toothed-pulley increases. Thus, when the rack end and the housing come into contact with each other in the axial direction, the ball screw nut tilts relative to the ball screw shaft, so that the distance between the center of rotation of the driving toothed-pulley and that of the driven toothed-pulley increases. Thus, the support stiffness with which the driving toothed-pulley and the driven toothed-pulley support the toothed belt is enhanced, so that the toothed belt is less likely to jump the teeth of the pulley.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
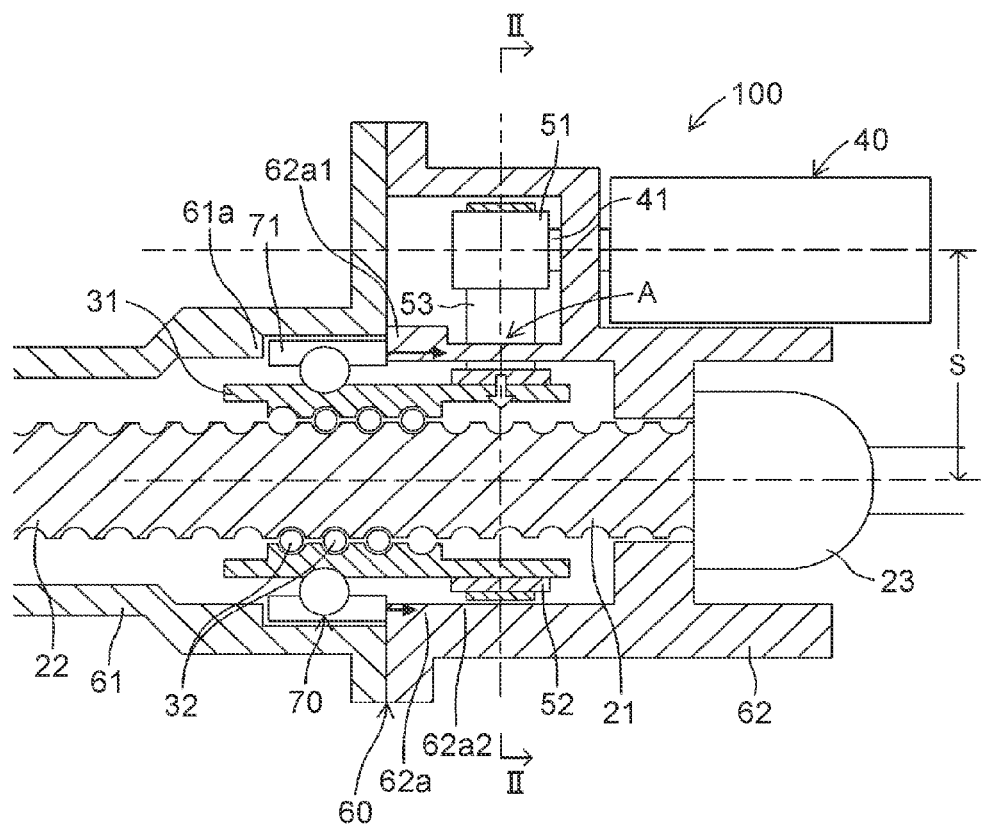
FIG. 1 is a front vertical sectional view schematically illustrating an electric power steering apparatus according to an embodiment of the invention.
Figure 2:
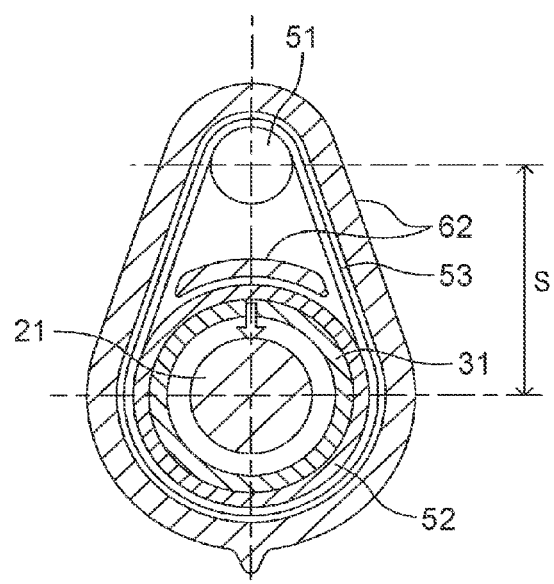
FIG. 2 is a cross-sectional view taken along the line II-II in FIG. 1.
Figure 3:
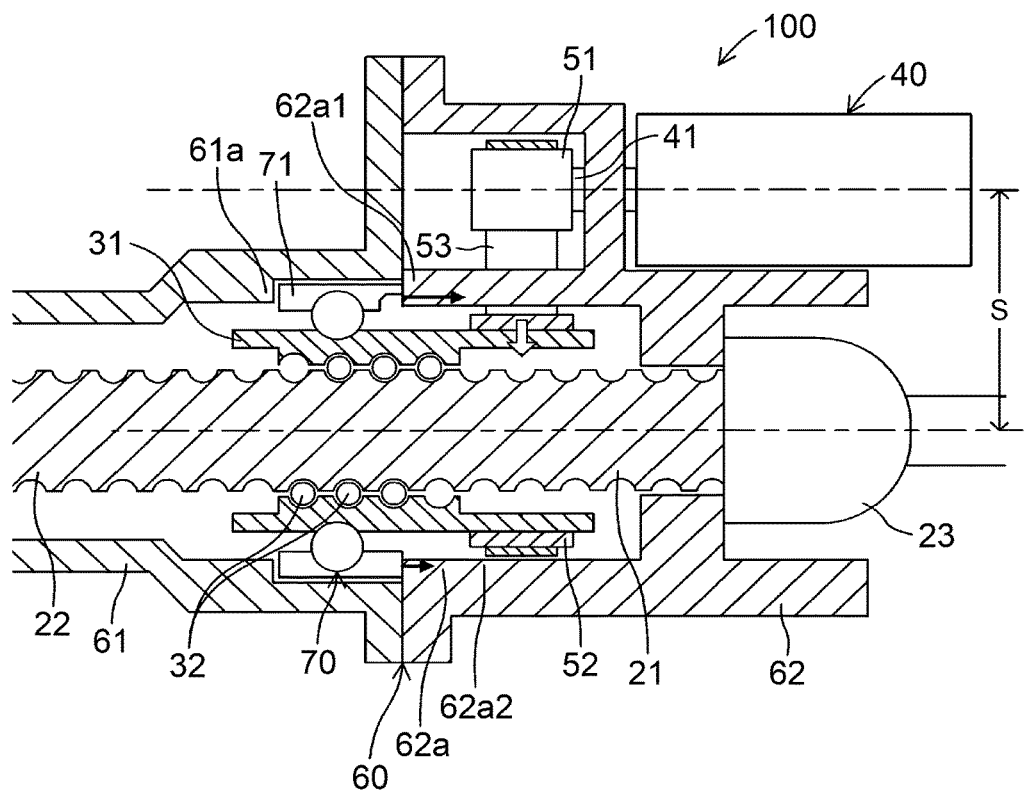
FIG. 3 is a front vertical sectional view schematically illustrating an electric power steering apparatus according to another embodiment of the invention.

Hereinafter, an embodiment of the invention will be described with reference to the accompanying drawings. FIG. 1 and FIG. 2 schematically illustrate an electric power steering apparatus 100 according the embodiment of the invention. The electric power steering apparatus 100 includes a ball screw shaft 21, a ball screw nut 31, and an electric motor 40. The electric power steering apparatus 100 further includes a driving toothed-pulley 51, a driven toothed-pulley 52, and a toothed belt 53.

The ball screw shaft 21 is integral with a rack shaft 22 that is provided so as to be movable relative to the housing 60 in the vehicle-width direction (the right-left direction in FIG. 1). As is known in the art, the rack shaft 22 is coupled to a steering wheel (not illustrated) via, for example, a pinion shaft (not illustrated) and a steering shaft (not illustrated). Rack ends 23 are provided at respective ends of the rack shaft 22 (the left end is not illustrated in FIG. 1). Each rack end 23 is provided so as to be able to come into contact with an end face of the housing 60. The amount of axial travel of the rack shaft 22 is limited when any one of the rack ends 23 and the housing 60 come into contact with each other in the axial direction.

In the housing 60, the ball screw nut 31 is rotatably mounted on the ball screw shaft 21 with a plurality of balls 32 interposed therebetween. The ball screw nut 31 is fitted, at a portion of its outer periphery on one side (the left side in FIG. 1) in the axial direction, to the housing 60 via a bearing 70, such that the ball screw nut 31 is rotatable relative to the housing 60 and immovable in the axial direction relative to the housing 60. The driven toothed-pulley 52 is fixedly fitted onto a portion of the outer periphery of the ball screw nut 31 on the other side (the right side in FIG. 1) in the axial direction. The driven toothed-pulley 52 is configured to rotate together with the ball screw nut 31 in an integrated manner.

The electric motor 40 is mounted on the housing 60 with a rotary shaft 41 thereof parallel to the ball screw shaft 21. The driving toothed-pulley 51 is fixedly fitted to the rotary shaft 41 of the electric motor 40. The driving toothed-pulley 51 and the driven toothed-pulley 52 are located at the same position in the axial direction. The toothed belt 53 is looped over the driving toothed-pulley 51 and the driven toothed-pulley 52, so that the rotary torque generated by the electric motor 40 is transmitted to the ball screw nut 31.

The housing 60 includes a left housing 61 and a right housing 62. An outer race 71 of the bearing 70 is held between a portion 61a of the left housing 61 and a portion 62a of the right housing 62 in the axial direction.

In the electric power steering apparatus 100, the electric motor 40 is configured to be driven based on the steering torque transmitted from the steering wheel to the steering shaft. Thus, the electric power steering apparatus 100 is configured to provide steering assistance by using an axial driving force (i.e., a force to be added to a driving force in the axial direction of the rack shaft 22, which is obtained by subjecting a rotary operation force of the steering wheel to conversion by a pinion and a rack) that is applied to the rack shaft 22 when the rotary torque of the rotary shaft 41 is transmitted through the driving toothed-pulley 51, the toothed belt 53, and the driven toothed-pulley 52 to the ball screw nut 31.

In the present embodiment, a tilt allowing portion A is provided. When the rack end 23 and the right housing 62 come into contact with each other in the axial direction, the tilt allowing portion A causes the ball screw nut 31 to tilt relative to the ball screw shaft 21 such that a distance S between the center of rotation of the driving toothed-pulley 51 and the center of rotation of the driven toothed-pulley 52 increases. The right housing 62 disposed between the bearing 70 and the rack end 23 includes the tilt allowing portion A. In the tilt allowing portion A, the axial stiffness of a housing first stopper portion 62a1 that restricts the axial displacement of the bearing 70 on the driving toothed-pulley side of the bearing 70 (the upper side in FIG. 1) is set lower than the axial stiffness of a housing second stopper portion 62a2 that restricts the axial displacement of the bearing 70 on the driven toothed-pulley side of the bearing 70 (the lower side in FIG. 1) (i.e., the wall thickness of the right housing 62 on the upper side is set smaller than the wall thickness of the right housing 62 on the lower side). With this configuration, when the same magnitude of axial load is applied to each of the housing first stopper portion 62a1 and the housing second stopper portion 62a2 from the bearing 70, the housing first stopper portion 62a1 deflects in the axial direction by a larger amount than the housing second stopper portion 62a2 as indicated by arrows in FIG. 1. As a result, the bearing 70 tilts rightward about the lower end thereof serving as a supporting point, causing the ball screw nut 31 to tilt relative to the ball screw shaft 21 such that the right side of the ball screw nut 31 in FIG. 1 moves downward in FIG. 1 and FIG. 2 (in the direction indicated by an outlined arrow in FIG. 2).

In the thus configured electric power steering apparatus 100 of the present embodiment, the right housing 62 includes the tilt allowing portion A that causes the ball screw nut 31 to tilt relative to the ball screw shaft 21 such that the distance S between the center of rotation of the driving toothed-pulley 51 and the center of rotation of the driven toothed-pulley 52 increases when the rack end 23 on the right side in FIG. 1 and the housing 60 come into contact with each other in the axial direction. With this configuration, when the rack end 23 on the right side in FIG. 1 and the housing 60 come into contact with each other in the axial direction as illustrated in FIG. 1, the ball screw nut 31 tilts relative to the ball screw shaft 21 such that the right side of the ball screw nut 31 in FIG. 1 moves downward in FIG. 1 and FIG. 2, so that the distance S between the center of rotation of the driving toothed-pulley 51 and the center of rotation of the driven toothed-pulley 52 increases. Thus, the support stiffness with which the driving toothed-pulley 51 and the driven toothed-pulley 52 support the toothed belt 53 is enhanced, so that the toothed belt 53 is less likely to jump the teeth of the pulley.

In the above-described embodiment, the tilt allowing portion A that causes the ball screw nut 31 to tilt relative to the ball screw shaft 21 as described above is included in the right housing 62. Alternatively, a portion corresponding to the tilt allowing portion A may be included in the outer race 71 of the bearing 70. In this case, the axial stiffness of a first portion of the outer race 71, the first portion coming into contact with the housing first stopper portion that restricts the axial displacement of the bearing 70 on the driving toothed-pulley side of the bearing 70 (the axial stiffness of a portion of the outer race 71, which is located on the upper side in FIG. 1) needs to be set lower than the axial stiffness of a second portion of the outer race 71, the second portion coming into contact with the housing second stopper portion that restricts the axial displacement of the bearing 70 the driven toothed-pulley side of the bearing 70 (the axial stiffness of a portion of the outer race 71, which is located on the lower side in FIG. 1).

In the above-described embodiments, the axial stiffness of each portion is set such that the distance S between the center of rotation of the driving toothed-pulley 51 and the center of rotation of the driven toothed-pulley 52 increases when the rack end 23 on the right side in FIG. 1 and the housing 60 come into contact with each other in the axial direction. However, in the case where the axial stiffness of each portion is set such that the distance S between the center of rotation of the driving toothed-pulley 51 and the center of rotation of the driven toothed-pulley 52 increases when the rack end (not illustrated) on the left side in FIG. 1 and the housing 60 come into contact with each other in the axial direction (in the case where the bearing 70 is disposed between a position where the pulleys 51, 52 and the toothed belt 53 are provided and the rack end (not illustrated) on the left side in FIG. 1), the axial stiffness of an upper portion of the housing or the outer race needs to be set higher than the axial stiffness of a lower portion of the housing or the outer race, because loads applied in the axial direction of the rack shaft 22 are headed in the directions reversed from those in the above-described embodiment in the right-left direction.

What is claimed is:

1. An electric power steering apparatus including:
    a ball screw shaft that is integral with a rack shaft provided so as to be movable relative to a housing in a vehicle-width direction;
    a ball screw nut rotatably mounted on the ball screw shaft, the ball screw nut being fitted at a portion of an outer periphery on one side in an axial direction, to the housing via a bearing such that the ball screw nut is rotatable relative to the housing and immovable in the axial direction relative to the housing;
    a driven toothed-pulley fixedly fitted onto a portion of the outer periphery of the ball screw nut on the other side in the axial direction, the driven toothed-pulley being configured to rotate together with the ball screw nut in an integrated manner;
    an electric motor mounted on the housing;
    a driving toothed-pulley to which rotary torque generated by the electric motor is transmitted, the driving toothed-pulley and the driven toothed-pulley are located in a same plane in the axial direction; and
    a toothed belt looped over the driving toothed-pulley and the driven toothed-pulley to transmit the rotary torque generated by the electric motor to the ball screw nut,
    the electric power steering apparatus configured to provide steering assistance by using an axial driving force that is applied to the rack shaft when the rotary torque generated by the electric motor is transmitted to the ball screw nut, and
    the electric power steering apparatus configured such that an amount of axial travel of the rack shaft is limited when a rack end provided at an end of the rack shaft and the housing come into contact with each other in the axial direction,
    the electric power steering apparatus comprising a tilt allowing portion configured to cause the ball screw nut to tilt relative to the ball screw shaft such that a distance between a center of rotation of the driven toothed-pulley and a center of rotation of the driving toothed-pulley increases when the rack end and the housing come into contact with each other in the axial direction.

2. The electric power steering apparatus according to claim 1, wherein:
    in a case where the driven toothed-pulley, the driving toothed-pulley, and the toothed belt are disposed between the bearing and the rack end, the tilt allowing portion is included in the housing; and
    in the tilt allowing portion, axial stiffness of a housing first stopper portion that restricts an axial displacement of the bearing on the driving toothed-pulley side of the bearing is set lower than axial stiffness of a housing second stopper portion that restricts the axial displacement of the bearing on the driven toothed-pulley side of the bearing.

3. The electric power steering apparatus according to claim 1, wherein:
    in a case where the driven toothed-pulley, the driving toothed-pulley, and the toothed belt are disposed between the bearing and the rack end, the tilt allowing portion is included in an outer race of the bearing; and
    in the tilt allowing portion, axial stiffness of a first portion of the outer race, the first portion coming into contact with a housing first stopper portion that restricts an axial displacement of the bearing on the driving toothed-pulley side of the bearing, is set lower than axial stiffness of a second portion of the outer race, the second portion coming into contact with a housing second stopper portion that restricts the axial displacement of the bearing on the driven toothed-pulley side of the bearing.

* * * * *